United States Patent
Isobe et al.

(10) Patent No.: US 7,622,057 B2
(45) Date of Patent: Nov. 24, 2009

(54) PHOSPHOR AND VACUUM ULTRAVIOLET EXCITED LIGHT-EMITTING DEVICE

(75) Inventors: Toshinori Isobe, Tsukuba (JP); Keiji Ono, Nerima-ku (JP); Susumu Miyazaki, Toride (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 380 days.

(21) Appl. No.: 10/556,680

(22) PCT Filed: May 13, 2004

(86) PCT No.: PCT/JP2004/006795

§ 371 (c)(1), (2), (4) Date: Nov. 14, 2005

(87) PCT Pub. No.: WO2004/101710

PCT Pub. Date: Nov. 25, 2004

(65) Prior Publication Data

US 2007/0029524 A1  Feb. 8, 2007

(30) Foreign Application Priority Data

May 16, 2003 (JP) ............................. 2003-138620

(51) Int. Cl.
*C09K 11/59* (2006.01)
*C09K 11/08* (2006.01)
(52) U.S. Cl. ................................. 252/301.4 F; 257/431
(58) Field of Classification Search ............ 252/301.4 F
See application file for complete search history.

(56) References Cited

U.S. PATENT DOCUMENTS

| 6,802,990 | B2 | 10/2004 | Toda et al. |
| 7,011,770 | B2 * | 3/2006 | Imanari et al. ........ 252/301.4 F |
| 2002/0038861 | A1 * | 4/2002 | Toda et al. ............ 252/301.4 F |
| 2003/0085853 | A1 | 5/2003 | Shiiki et al. |

FOREIGN PATENT DOCUMENTS

| CN | 1417831 | 5/2003 |
| EP | 1 193 306 A2 | 4/2002 |
| GB | 1 205 298 | 9/1970 |
| JP | 2002-332481 A | 11/2002 |
| JP | 2003-142004 A | 5/2003 |

OTHER PUBLICATIONS

Takashi Kunimoto et al., "Feasibility Study of Silicate Phosphor CaMgSi$_2$O$_6$:Eu$^{2+}$ as Blue PDP Phosphors", *IEICE Trans. Electron.*, vol. E85-C, No. 11, Nov. 2002, pp. 1888-1894.
Database WPI Week 200340, Derwent Publications Ltd., London, GB, AN 2003-430443, XP002459090.

* cited by examiner

*Primary Examiner*—Jerry Lorengo
*Assistant Examiner*—Kevin M Johnson
(74) *Attorney, Agent, or Firm*—Sughrue Mion, PLLC

(57) ABSTRACT

A phosphor and a vacuum ultraviolet excited light-emitting device are disclosed. The phosphor comprises a compound represented by the following formula (1)

$$Ca_{1-a-b}Sr_aEu_bMgSi_2O_6 \qquad (1)$$

wherein $0.1 < a \leqq 0.35$ and $0.003 \leqq b \leqq 0.02$. The phosphor is excited by vacuum ultraviolet and emits blue light with high brightness. The vacuum ultraviolet excited light-emitting device comprises the above phosphor.

7 Claims, No Drawings

PHOSPHOR AND VACUUM ULTRAVIOLET EXCITED LIGHT-EMITTING DEVICE

TECHNICAL FIELD

The present invention relates to a phosphor and a vacuum ultraviolet excited light-emitting device.

BACKGROUND ART

A phosphor is used in a vacuum ultraviolet excited light-emitting device such as plasma display panel (hereinafter being abbreviated as "PDP") and rare gas lamp. For example, a compound represented by the formula $BaMgAl_{10}O_{17}$:Eu or $CaMgSi_2O_6$:Eu is known as a phosphor for PDP, which is excited under irradiation with vacuum ultraviolet to emit blue light. (IEICE Transaction on Electronics Special Issue on Electronic Displays, The Institute of Electronics, Information and Communication Engineers, E-85-C, 2002.11, p. 1888~1894).

DISCLOSURE OF THE INVENTION

The object of the present invention is to provide a phosphor having higher brightness than a conventional phosphor and a vacuum ultraviolet excited light-emitting device.

The present inventors have studied to solve the object described above, resultantly leading to completion of the invention.

Namely, the present invention provides a phosphor comprising a compound represented by the formula (1);

$$Ca_{1-a-b}Sr_aEu_bMgSi_2O_6 \quad (1),$$

wherein $0.1 < a \leqq 0.35$ and $0.003 \leqq b \leqq 0.02$.

The invention also provides a vacuum ultraviolet excited light-emitting device comprising the phosphor described above.

Mode for Carrying Out the Invention

The phosphor of the present invention comprises a compound represented by the above formula (1). In the formula (1), a is more than 0.1, preferably 0.15 or more, and 0.35 or less, preferably 0.32 or less. In the formula (1), b is 0.003 or more, preferably 0.005 or more, and 0.02 or less, preferably 0.015 or less.

The phosphor of the present invention preferably has the same crystal structure as diopside.

The compound represented by the above formula (1) may be prepared by mixing metal compounds to satisfy the composition ratio represented by the formula (1) and then calcining the mixture. For example, at least two metal compounds are weighed to satisfy a predetermined composition, followed by mixing; and then the mixture is calcined.

Metal compounds are calcium compounds, strontium compounds, europium compounds, magnesium compounds, silicon compounds or compounds containing these metals and the like. Examples of the metal compounds include compounds, which are transformable to oxides at high temperature, such as hydroxides, carbonates, nitrates, halides and oxalates with high purity (about 99% by weight or higher), or oxides with high purity (about 99% by weight or higher).

These metal compounds are weighed to obtain predetermined composition. For example, when preparing a compound represented by a formula of $Ca_{0.792}Sr_{0.196}Eu_{0.012}MgSi_2O_6$, $CaCO_3$, $SrCO_3$, $Eu_2O_3$, MgO and $SiO_2$ may be weighed so as to satisfy the molar ratio of $CaCO_3$: $SrCO_3$: $Eu_2O_3$: MgO: $SiO_2$ is 0.792: 0.196: 0.006: 1: 2.

The weighed metal compounds may be mixed, for example, by using a ball mill, V-shape mixer or stirring apparatus. In viewpoint of enhancing crystallinity of the phosphor and/or controlling crystal size of the phosphor, the metal compounds may be added with appropriate amount of a flux to be mixed.

Calcination of the mixture is preferably carried out under a reductive atmosphere. For example, it is preferable the calcination is carried out under a nitrogen ($N_2$) atmosphere containing about 0.1-10% by volume of hydrogen, or under an argon (Ar) atmosphere containing about 0.1-10% by volume of hydrogen. In viewpoint of gaining highly reductive effect, a mixture including at least two metal compounds added with an appropriate amount of carbon maybe calcined, or at least two metal compounds may be mixed with an appropriate amount of carbon, followed by calcining the mixture. The calcination may be carried out under conditions of temperature: about 900-1500° C., and time: about 1-100 hours.

In case a compound, which is decomposed to be an oxide at high temperature such as hydroxides, carbonates, nitrates, halides and oxalates, is contained in the mixture described above, the mixture may be pre-calcined before the calcination. The pre-calcination may be carried out under any of oxidizing atmosphere (for example, under air) and reducing atmosphere. The pre-calcination may be carried out at a temperature to remove crystal water contained in hydroxide, carbonate, nitrate, halide and oxalate or at a temperature to transform hydroxide, carbonate, nitrate, halide and oxalate to an oxide, usually carried out in a range of about 400° C. or higher and lower than about 900° C.

The phosphor obtained by calcination may be pulverized, washed or classified. Pulverizing may be carried out by using a ball mill or jet mill. Thus obtained phosphor may be subjected to heat treatment. By the heat treatment, a phosphor having much higher brightness is obtained. The heat treatment may be carried out under the same conditions as the calcination described above.

The phosphor of the present invention is excited under irradiation with vacuum ultraviolet having a wavelength of 200 nm or less (for example, light having a wavelength of 146 nm emitted from Xe plasma discharge and the like) to emit blue light with high brightness.

The vacuum ultraviolet excited light-emitting device of the present invention comprises the phosphor described above, and usually has electrodes in addition to the phosphor. Examples of the vacuum ultraviolet excited light-emitting device include PDP, rare gas lamp.

A PDP comprises a rear plate, phosphor layers, transparent electrodes, bus electrodes, a dielectric layer and a front plate. For example, such PDP may be produced by a method disclosed in JP-A-10-195428.

A method for producing a PDP comprises steps of:

(I) mixing a phosphor, a binder (cellulose-based compound, polyvinyl alcohol) with an organic solvent for respective phosphors emitting blue light, green light or red light to prepare phosphor pastes, (II) coating each of the phosphor pastes prepared by the step (I) for blue light, green light or red light on an inner face of a rear plate provided with address electrodes which is formed in a stripe shape by barrier ribs and on the surface of the barrier ribs by screen printing or the like, and then calcining the coated paste at from about 300° C. to about 600° C. to form phosphor layers, respectively, (III) bonding the rear plate with a front glass plate which is provided with a dielectric layer and a protective layer on the inner face of the front glass plate so that transparent electrodes and bus electrodes are arranged in the orthogonal direction of the phosphor layer, and (IV) evacuating air from a space between the rear plate and the front glass plate and sealing a reduced-pressure gas (Xe, Ne and the like) in the space to form a discharge space.

A rare gas lamp may be produced by a method similar to known methods except the phosphor described above is used a raw material.

EXAMPLES

The present invention will be explained in more detail by following examples, which should not be constructed as limiting the invention in any manner. Brightness of a phosphor was measured by the following method.

A phosphor was irradiated by vacuum ultraviolet with an excimer lamps at wavelength of 146 nm (manufactured by USHIO INC., H0012 type) in a vacuum chamber under pressure of 6.7 Pa ($5 \times 10^{-2}$ Torr) or lower.

Reference

Calcium carbonate (manufactured by Ube Material Industries, Ltd., $CaCO_3$), strontium carbonate (manufactured by Wako Pure Chemical Industries, Ltd., $SrCO_3$), europium oxide (manufactured by Shin-Etsu Chemical Co., Ltd., $Eu_2O_3$), magnesium carbonate (manufactured by Kyowa Chemical Industry Co., Ltd., $MgCO_3$) and silicon dioxide $SiO_2$ (manufactured by NIPPON AEROSIL CO., LTD., $SiO_2$) were weighed so as to satisfy the molar ratio of $CaCO_3 : SrCO_3 : Eu_2O_3 : MgCO_3 : SiO_2$ was $0.9215 : 0.0485 : 0.015 : 1 : 2$, and then these were mixed. The mixture was calcined under $N_2$ atmosphere containing 2% by volume of $H_2$ at 1180° C. for 2 hours. The resultant calcined product was subjected to a heat treatment under $N_2$ atmosphere containing 2% by volume of $H_2$ at 1180° C. for 2 hours to obtain a phosphor. The phosphor had the same crystal structure as diopside and a compound represented by a formula of $Ca_{0.9215}Sr_{0.0485}Eu_{0.03}MgSi_2O_6$ [a is 0.0485 and b is 0.03 in the formula (1)].

The phosphor emitted blue light under irradiation with vacuum ultraviolet. The brightness of the phosphor was assumed be 100.

Example 1

Calcium carbonate (manufactured by Ube Material Industries, Ltd., $CaCO_3$), strontium carbonate (manufactured by Wako Pure Chemical Industries, Ltd., $SrCO_3$), europium oxide (manufactured by Shin-Etsu Chemical Co., Ltd., $Eu_2O_3$), magnesium carbonate (manufactured by Kyowa Chemical Industry Co., Ltd., $MgCO_3$) and silicon dioxide $SiO_2$ (manufactured by NIPPON AEROSIL CO., LTD., $SiO_2$) were weighed so as to satisfy the molar ratio of $CaCO_3 : SrCO_3 : Eu_2O_3 : MgCO_3 : SiO_2$ was $0.792 : 0.196 : 0.006 : 1 : 2$, and then these were mixed. The mixture was calcined under $N_2$ atmosphere containing 2% by volume of $H_2$ at 1180° C. for 2 hours. The resultant calcined product was subjected to a heat treatment under $N_2$ atmosphere containing 2% by volume of $H_2$ at 1180° C. for 2 hours to obtain a phosphor. The phosphor had the same crystal structure as diopside and a compound represented by a formula of $Ca_{0.792}Sr_{0.196}Eu_{0.012}MgSi_2O_6$ [a is 0.196 and b is 0.012 in the formula (1)].

The phosphor emitted blue light under irradiation with vacuum ultraviolet and had a brightness of 156.

Example 2

The same operation as in Example 1 was carried out except that the molar ratio of $CaCO_3 : SrCO_3 : Eu_2O_3 : MgCO_3 : SiO_2$ was changed to $0.692 : 0.3 : 0.004 : 1 : 2$, the calcination temperature was changed to 1170° C. and the heat treatment temperature was changed to 1170° C. to obtain a phosphor.

The phosphor had the same crystal structure as diopside and a compound represented by a formula of $Ca_{0.692}Sr_{0.3}Eu_{0.008}MgSi_2O_6$ [a is 0.3 and b is 0.008 in the formula (1)].

The phosphor emitted blue light under irradiation with vacuum ultraviolet and had a brightness of 153.

The invention claimed is:

1. A phosphor comprising a compound represented by the following formula (1);

$$Ca_{1-a-b}Sr_aEu_bMgSi_2O_6 \qquad (1)$$

wherein $0.1 < a \leq 0.35$ and $0.003 \leq b \leq 0.02$.

2. The phosphor according to claim 1, wherein the phosphor satisfies $0.15 \leq a \leq 0.35$ and $0.003 \leq b \leq 0.02$ in the formula (1).

3. The phosphor according to claim 2, wherein the phosphor satisfies $0.15 \leq a \leq 0.32$ and $0.003 \leq b \leq 0.02$ in the formula (1).

4. The phosphor according to claim 3, wherein the phosphor satisfies $0.15 \leq a \leq 0.32$ and $0.005 \leq b \leq 0.015$ in the formula (1).

5. The phosphor according to any of claim 1 to 4, wherein the phosphor has a crystal structure of diopside.

6. A vacuum ultraviolet excited light-emitting device comprising the phosphor according to any of claim 1 to 4.

7. A vacuum ultraviolet excited light-emitting device comprising the phosphor according to claim 5.

* * * * *

UNITED STATES PATENT AND TRADEMARK OFFICE
CERTIFICATE OF CORRECTION

PATENT NO. : 7,622,057 B2
APPLICATION NO. : 10/556680
DATED : November 24, 2009
INVENTOR(S) : Isobe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twenty-sixth Day of October, 2010

David J. Kappos
*Director of the United States Patent and Trademark Office*